United States Patent Office 3,536,490

Patented Oct. 27, 1970

3,536,490

NOVEL DIAZOTYPE COPYING PROCESS

David Louis Hochberg, New York, N.Y., assignor to Pitney-Bowes, Inc., Stamford, Conn., a corporation of Delaware No Drawing. Filed Apr. 28, 1964, Ser. No. 363,289
Int. Cl. G03c *5/10, 5/20, 5/34*
U.S. Cl. 96—47 14 Claims

ABSTRACT OF THE DISCLOSURE

This invention relates to a process for reproducing on a non-opaque master sheet. Using this process in the reflux mode, the master sheet is placed over the original sheet and actinic light is passed through the master sheet onto the surface of the original sheet and is reflected back to the master sheet such that light-scattering discontinuities are preferentially formed in the coating in the master sheet at the non-image areas during the exposure step. The master sheet employed in the process is one which contains a coating of a film-former material which has incorporated therein a material capable of generating gas during exposure to actinic light. The film-former coating is impervious to the gas formed during the exposure to actinic light and is also sufficiently deformable to form light-scattering discontinuities in the coating upon exposure to actinic light.

This invention relates to novel copying processes using diazotype materials and to novel light-sensitive diazotype papers. More particularly, this invention relates to novel processes for the copying of material onto novel master sheets using diazonium compounds, which material can then be transferred to receptor sheets.

Processes utilizing diazonium compounds have been developed for the copying of printed material. One attraction of these processes is the economy of cost in producing copies of the original document. Unfortunately, diazotype processes now commercially available have defects which hinder their commercial acceptability. One important defect of these processes is the inability to use them to prepare satisfactory copies by a reflex method, i.e., a method wherein actinic light passes through the light-sensitive material before reaching the original to be copied.

One presently known diazotype process involves the formation of light-scattering discontinuities at non-image areas by heating the entrapped gaseous decomposition product of previously exposed solid particles of a diazonium compound suspended in a thermoplastic coating on a polymeric film, said gases having been generated by the action of the actinic light upon the diazonium compound. Such films require a second, low intensity exposure to actinic light followed by long, low temperature storage in order to follow the generated nitrogen gas in image areas to diffuse out of the film without formation of light-scattering centers in these image areas as well as in the intended non-image areas. These films are useful in the projection of images rather than in a copy process. However, by employing black paper instead of the polymeric film, a copy sheet suitable for preparation of see-through copy is obtained. Such a black copy sheet is also unsuitable for optical reflex copy preparation.

In addition, virtually all processes utilizing diazonium compounds in their most often employed methods are restricted to the use of one-sided originals transparent or translucent to actinic light and cannot be used to copy material either from an original printed on both sides or from an opaque one-sided original. Attempts at reflexing using screens and foils have not been commercially accepted because of either long exposure times, complicated handling procedures, and/or developed images of low dye density.

It is therefore an object of this invention to provide novel processes for the reproduction of printed material using diazotype compounds.

It is a further object of this invention to provide simple, efficient, inexpensive, diazotype processes for the reproduction of printed matter.

It is still a further object of this invention to provide novel diazotype processes which will permit material to be copied from an original containing printed material on both sides thereof as well as from an opaque one-sided original, such aforementioned originals not lending themselves to being copied by conventional diazotype processes.

It is another object of this invention to provide copy sheets which will give sharp, clear images of high fidelity and which will not prematurely couple when stored for long periods of time under normal storage conditions for such papers.

It is still another object to provide copy sheets which will give faithful resolution and also visibly intense images of most common printed colors on the original to be copied.

Another object is to provide copy papers to which information can be added after the first development by subsequent development in either the same or different colors as obtained during the first development.

These and other objects will become apparent from the following detailed description.

In this application the term "original sheet" will be used to refer to the sheet containing the subject matter to be copied. The term "master sheet" will refer to the sheet which, along with the original sheet, is exposed to actinic light. The term "receptor sheet" will be used to refer to the sheet to which the master sheet or a portion thereof maybe transferred. The term "printed material" is used in the generic sense and is intended to encompass typewritten and handwritten material, drawings sketches and other matter to be copied. In any case, this "printed material" is any area of the original sheet which is more absorbent (less reflective) of actinic light than another area of the original sheet. "Image" area refers to an area of the master sheet which corresponds to printed material of the original sheet.

According to this invention, there are provided processes for the reproduction of printed material which comprise placing a non-opaque master sheet containing a coating of a film-former, in which has been incorporated a diazonium compound, over the surface of the original sheet containing the printed material to be copied, shining actinic light through said master sheet onto the surface of said original sheet and obtaining preferential reflection of said light back through said master sheet thereby forming light-scattering discontinuities at the non-image areas in said coating in said master sheet during exposure to said light due to the preferred decomposition of the diazonium compound at said non-image areas as compared with that at the image areas. Optionally, the undecomposed diazonium compound in said master sheet is coupled to produce a dye and said coating is transferred to a receptor sheet.

In carrying out the processes of the invention, the master sheet, which comprises a sheet of base stock coated with a film-forming solution containing the diazonium compound and which will be described in greater detail hereinafter, is placed over the original sheet and weakly absorbed actinic light (generally obtained, for example, by suitably filtering the emitted light from a mercury vapor lamp which has a standard line spectrum) is passed through the master sheet. It is well known, of course, that many diazonium compounds are completely decomposed when illuminated by actinic light characterized by the mercury vapor lamp 3650 A. and 4047 A. lines, and it is therefore necessary, with these diazonium compounds, to filter out this most strongly-absorbed actinic light prior to passing the light through the master sheet so as to avoid complete decomposition of the diazonium compound contained therein before actinic light actually reaches the original. After passing through the master sheet, the light strikes the surface of the original sheet and is preferentially reflected back onto the surface of the master sheet and through said master sheet. A greater percentage of the light which strikes the surface of those portions of the original sheet which do not contain printed material is reflected back onto the non-image portions of the master sheet. Since the diazonium-containing layer and the original are in intimate contact, there is minimal image distortion. The actinic light passing through the master sheet preferentially decomposes the diazonium compound contained in the master sheet at the non-image areas. The decomposition of the diazonium compound causes the evolution of nitrogen gas which in turn causes the formation of light-scattering discontinuities in the film-former layer of the master sheet. The light-scattering centers are formed because the nearly insoluble rapidly generated gas is retained in the film-formed layer covering the master sheet and does not escape rapidly by diffusion from the relatively dry impervious film. Light which passes through the image portions of the master sheet (which cover printed material of the original sheet) is preferentially absorbed by the printed material of the original sheet such that the diazonium compound at the image areas is preferentially not decomposed to the same extent as that at the non-image portions, and hence the image portions of the master sheet are relatively devoid of light-scattering centers. After optionally coupling the undecomposed diazonium compound to form a dye, which procedure is to be described in greater detail below, the film-former layer can then be transferred to a receptor sheet.

It is known that in the absence of any magnification step, unacceptably poor contrast is obtained in the reflexing of films containing diazonium compounds and coated by conventional methods. While not wishing to be bound by any theory, it is proposed that reflexing using diazonium-containing layers is possible according to this invention because the formation of light-scattering centers during the exposure step serves quite effectively to preferentially "increase the speed" of non-image areas. "Speed" is used in the sense commonly known in the photographic art.

It has been observed that the light-sensitivity or speed of decomposition of dissolved diazonium salts in layers containing film-formers is greatly enhanced by the incorporation in suspension of finely divided silica of the proper particle size and size distribution. The diazonium compound is not affected chemically by the addition of inert silica. Theorizing, it is most likely that the silica increases the speed of decomposition of the exposed diazonium-containing layer by providing light-scattering centers for increased incidence of multiple internal reflection within the diazonium-containing layer. A photon of actinic light travels a longer path through pigmented film than through an unpigmented film of the same thickness and hence has a higher absorption probability. Absorption of a photon by a molecule of a diazonium compound results in decomposition or loss of nitrogen from the molecule of the diazonium compound and, therefore, loss of the ability of the diazonium compound to form an azo dye in a subsequent coupling reaction. The light-scattering centers formed by reflex exposure of unpigmented diazonium containing layers according to the invention are believed to have the same or similar light-scattering and speed-increasing property as does colloidal silica. Hence the required multiplication factor for successful reflexing exists in these vesicular films. If the discontinuity pattern is retained after both development of and transfer of the image to a receptor sheet, slight under-exposure may be carried out so as to allow a low background level of developed dye to exist in both image and non-image areas which will be satisfactorily hidden except in image areas by the covering power of the light-scattering discontinuities. This serves to increase the image dye density consistent with apparently white background and can be important, for example, in the case of thermal development processes wherein some of the small amount of diazonium compound remaining after exposure may be unintentionally thermally decomposed during development.

It will be realized that the speed of reflex exposure can be further increased if the master sheet is heated during or just prior to the exposure step, thereby requiring the decomposition of less diazonium salt to enlarge the discontinuities to a given desired size. Fewer photons of actinic light are required to generate a discontinuity of a given size in this manner and, alternatively, higher speed is achieved with the same number of photons of actinic light. Among the techniques which might be employed for such heating during exposure are the incorporation of a suitable contact heating device in proximity to the exposure station, or the circulation of a heated fluid near to or inside of that part of the exposure device which contacts the master sheet, or preheating the master which would retain heat during the exposure step, or the like.

It has previously been proposed, in otherwise conventional "see-through" processes, that vesicle formation may be aided if heat is applied to the vesicle-forming layer during exposure by absorption of heat radiation from the source of actinic light. In the process of this invention, such radiant heat absorption by printed material of the original sheet is detrimental to reflex image formation wherein vesicles are preferentially to be formed in non-image areas of the master sheet. Radiant heat energy is absorbed by the printed material causing heating of and aiding vesicle formation in the image areas which is undesirable in the present case.

In carrying out the above described processes, coupling of the diazonium compound or compounds with the coupler or couplers can be effected by a number of procedures. For example, the coupling can be achieved by: contacting a reflex-exposed master sheet containing no couplers with an alkaline solution containing coupling components such as is done in the conventional semi-moist diazo process; or by heating a substance or mixture having the ability to couple and which supplies an alkaline medium such as a suitable alkaline amine, or a phenol in ammoniacal vapor; or exposing a master sheet containing couplers to an alkali-releasing material in either liquid or vapor form after reflexing; or the alkaline or alkali-releasing material may be incorporated as a separate layer on the master sheet with the coupling taking place during a thermal development step; or by incorporating in the receptor sheet a layer of alkaline or alkali-releasing material which when brought into contact with the master sheet and subjected to heat, causes coupling to take place; or the like.

According to a process incorporating the present invention, a master sheet coated according to any of the procedures described below is placed, after drying, over the original sheet and suitable actinic light is passed through the master sheet onto the original sheet and reflected back through the master sheet. Nitrogen-gas-containing light-scattering discontinuities form in the non-image areas of the master sheet and incomplete decomposition of the diazonium compound takes place at the image areas. The original sheet is then removed and the receptor sheet containing an alkaline or alkali-releasing layer is substituted therefor. The master sheet is then placed over the receptor sheet and the two sheets are then subjected to a thermal development step whereby coupling of the diazonium compound with the coupling component takes place so as to form a dye pattern at the image areas, with the remainder of the master sheet being covered with light-scattering centers trapped within the film-former layer. Upon completion of the thermal development step, the base stock of the master sheet, if desired, is stripped away from the receptor sheet with the material copied having been transferred to and remaining on the receptor sheet.

In carrying out the thermal development step, the master sheet and the receptor sheet are passed in contact with and over a heating element maintained at the proper temperature by conventional regulating means. It has been found that development time is dependent upon the decomposition temperature of the alkali-releasing agent as well as whether heat is supplied from one side or both sides of the sandwich and other obvious factors. Generally, of course, images are obtained more quickly when heat is applied from both sides of the master and receptor sheets.

It has also been found that if the receptor sheet and master sheet are placed between two heated surfaces, curved or flat, substantially higher temperatures than would be expected can be tolerated without any serious deleterious effects on the base stock of the master sheet made of a material such as Mylar which would distort at a much lower temperature if it were an unsupported film. "Mylar" is the trademark for a polyester condensation product of terephthalic acid and ethylene glycol manufactured by E. I. du Pont de Nemours and Co., Wilmington, Del.

In carrying out any of the above described modifications, it has been found that superior images result when optimum discontinuity or scattering center formation is obtained during the exposure step rather than during the development step. Optimum conditions exist when the image portions of the master sheet contain minimum (ideally no) visible scattering centers and the non-image portions contain a great number of scattering centers. It is essential that optimum scattering center formation occurs preferentially in the non-image areas during the exposure step.

It has sometimes been found desirable to incorporate a material as an intervening layer, to facilitate the transfer of the developed image in the film-former layer from the master sheet to the receptor sheet. Such a layer will hereinafter be called a transfer layer. Among the materials which may be used for this purpose is Gantrez AN–139 which is a copolymer of methyl vinyl ether and maleic anhydride.

The film-forming materials may be any which will form a coating over the master sheet base stock and which possess the necessary degree of plasticity and other properties required to allow optimal generation and retention of the light-scattering centers during exposure of the master sheet. A water soluble film-forming material such as Dow "Methocel," a methyl cellulose ether, has been found to be a suitable material. Numerous other materials such as Gantrez AN–169 and polyvinylpyrollidone may also be used as suitable film-forming materials provided that they possess the aforementioned properties to appropriate extents.

Diazonium compounds which may be employed in this process are any of those which satisfy a special absorption spectrum requirement for reflexing. The spectral requirement for reflexing is that the absorption peak of the diazonium compound is sufficiently remote from the wave length of the actinic light such that an adequate degree of preferential decomposition of the diazonium compound occurs at the non-image areas. These compounds include in part the water-soluble commercially available zinc chloride stabilized diazonium compounds derived from the following amines by diazotization: p-amino-N,N-dimethylaniline, p-amino-N,N-diethylaniline, p-amino-N-ethylaniline, p-amino-N-ethyl-N-beta-hydroxyethylaniline, p-amino-N-methyl-N-beta-hydroxyethylaniline, and the like.

These diazonium compounds have absorption maxima in aqueous solution located at about 3800 A. Utilizing the 4358 A. mercury line as the actinic source, the spectral requirement for reflex exposure according to the present invention is satisfied.

It is apparent that if other diazonium compounds whose absorption spectra peaks which are not in the vicinity of 3800 A. are used, and if the actinic radiation is selected (i.e., by suitable filtering) such that a similar situation with regard to the separation between peak-absorption wavelength and actinic wavelength exists, acseptable reflex copies can be generated provided that sufficient light-scattering center formation occurs during exposure. By way of illustration, the 4047 A. and 4358 A. mercury lines acting together enable formation of vesicles in master sheets employing p-diazo-N-ethyl-o-toluidine zinc chloride as the diazonium compound.

The actinic source must be intense enough that nitrogen gas is evolved with sufficient rapidity to generate discontinuities before excessive diffusion of said needed gas from the film to the atmosphere occurs.

Among the coupling materials which may be employed in this invention are conventional couplers such as 2,3-dihydroxynaphthalene-6-sulfonic acid sodium salt, phloroglucinol resorcinol, acetoacetanilide, and the like. Since the couplers are normally used in such amounts that they do not significantly affect the absorption spectrum of the diazonium compound when used with the latter in the film-former solution and since the diazonium compound usually has a much higher absorption coefficient, it should be apparent that many couplers, in addition to those mentioned which might be suitable for formation of acceptable dye images with the aforementioned diazonium compounds, are acceptable for use as described herein.

It has been found that conventional thermally stimulatable alkali-releasing agents, such as urea and many others, may be employed in this process. The use of these materials in a separate receptor sheet permits longer shelf-life for the master sheet during normal storage conditions. Ammonium salts, amines, amides, volatile stabilizing acids, acids capable of thermal decarboxylation, alkaline materials, phenols, complexes of amines and phenols, ammonia-containing coordination compounds, and the like, may be employed in either the receptor sheet or the master sheet in the various appropriate thermally developable systems.

In some cases, after transfer of the film-former layer, the developed receptor or copy sheet has a glossy surface. The glossy character of such a surface can be reduced by providing a gloss-elimination layer which, during transfer, is soft and tacky with respect to the master sheet base stock so that an irregular surface is left on the copy sheet after peeling off the base stock. The employment of this layer as the topside of a developed and transferred reflexed master sheet with the base stock subsequently removed, results in reduction of the undesirable glossy surface. Naturally, to become the topside of the copy, the aforementioned mixture is coated onto the master sheet prior to the application of the layer containing the diazonium compound and the film-former. Another gloss-eliminating measure is that of using receptor paper having proper surface roughness. Additional measures are brought out in the appended examples.

In an embodiment of this invention, the master sheet is first coated with one or more layers of a transfer material and/or a gloss-elimination mixture as discussed above. Then, the master sheet is coated with a solution of the film-former containing the dissolved diazonium compound. After reflex exposure as discussed above, the undecomposed diazonium compound and the coupling compound are coupled to form a dye and then transfer to the receptor sheet is effected.

In an embodiment of the invention, the base stock of the master sheet is first coated with a layer of an alkali-releasing material followed by the addition of one or more layers of transfer and gloss-elimination material. After drying each of these layers, the master sheet is then coated with a layer of the film-forming solution containing the diazonium compound and the coupler, which is also dried. After reflexing, the layers of the master sheet may be transferred to a receptor sheet which has received no special treatment. Alternatively, if it is either volatile or is placed in a nearby fusible layer, the coupler may be added in a separate layer from that containing the diazonium compound either followed by or preceded by a layer of the film-forming solution of the diazonium compound. After the base stock has been coated with these layers, the master sheet is reflexed as discussed above, the diazonium compound is coupled, the appropriate coatings on the master sheet are transferred to the receptor sheet, and the base layer of the master sheet is removed. The coupling can be effected either before, during or after the transfer step, by selection of one of the particular coupling means referred to above.

Various layer configurations may be employed in both the master sheet and the receptor sheet in carrying out the processes of the invention. If the coupler is volatile and intervening layers if any, (between the coupler and the diazocontaining film-forming layer), are permeable to the coupler, said coupler may be incorporated in any layer of either the master or receptor sheets.

The transfer material, if any, need not be restricted to being employed as the first coating applied to the master base stock. Its location with respect to the other layers employed, need be such that the diazo-containing layer be transferred to the receptor sheet either before, during or after development.

The gloss-elimination layer, if any, ordinarily should be so placed upon the master sheet as to represent the uppermost layer on the developed receptor sheet containing the transferred image.

The film-forming layer containing the diazonium compound may be the last coating applied to the master sheet so as to obtain maximum image sharpness, and may or may not contain the coupler or couplers as discussed earlier.

The alkaline or alkali-releasing layer may be employed in the receptor sheet for maximum storage stability of the diazo layer or may be eliminated entirely in the cases of gaseous ammonia development or alkaline liquid development.

To improve the adhesion of the material from the master sheet to the material on the receptor sheet, it may be desirable to incorporate an adhesive topcoat onto either or both the master and receptor sheets. Use of an adhesive layer may or may not eliminate the need for a transfer layer.

An all-in-one master sheet may be provided which permits the use of ordinary untreated paper for the receptor sheet since all of the necessary ingredients for production and transfer of the material to be copied would be incorporated in the all-in-one master sheet. Stability is accomplished by drying the master sheet to the minimum moisture content, and supplying the moisture necessary for coupling by heating any random moisture-containing receptor sheet during the development step. A water-vapor-impermeable topcoat may be applied to the diazo layer to prevent pickup of moisture during storage and handling prior to exposure if desired.

It is not necessary that the undecomposed diazonium compound in image areas of the master sheet be coupled in order to obtain a suitable copy or to enable use of the exposed master as a suitable medium for image projection. To use the exposed master sheet in obtaining a copy without coupling the remaining undecomposed diazo after exposure, the image-bearing layer containing the light-scattering discontinuities is transferred to a colored receptor sheet which may be black, whereby the light-scattering centers, which must be retained, will mask the colored background producing a contrasting image. To stabilize the discontinuity pattern of the image-bearing layer against exposure to high intensity actinic light, a second, low-intensity exposure to actinic light is employed, followed by a time period sufficient to allow gas generated in image areas to diffuse out of the film after the low-intensity exposure.

When the undecomposed diazonium compound at the image areas is not coupled after reflex image formation, black and white projections of the master sheet on a white screen may be obtained using a white light source so long as the light-scattering discontinuities at the non-image areas are retained. In this case the projected image is a negative of the original. Since the undecomposed diazonium compound is not coupled, a second, low-intensity exposure to actinic light followed by storage at non-elevated temperature, is effected for image permanence as in the case for copy preparation without coupling. Of course, immediate projection of the master sheet can be done without the stabilizing step provided that any effective degree of actinic light from the light source (as regards vesicle formation during projection) is eliminated before reaching the master sheet.

Another advantage of the invention described herein is that additional copied material can be added in either the same color or in a different color to a previously developed copy sheet prepared according to the invention. In this connection, a reflexed, developed, and transferred copy of the original or a portion thereof, is prepared in the usual way. Then, a similar exposure is made of the material to be added either using the same type of master material or using a type which produces images of different color, and development and transfer is effected to the previously transferred copy on the receptor sheet to which the added information pertains. This may be repeated several times. Obviously, if the alkaline-releasing material is contained in the receptor sheet and if several addenda are to be made, sufficient alkali-releasing material must be provided to insure complete development of all addenda. Naturally, the successive transferred layers must be permeable to the alkaline material generated. Furthermore, by exposing different portions of an original containing one-colored printed material to master sheets capable of forming different-colored images, one may prepare a multi-colored copy of the one-colored printed matter on the original.

Copied images may be made to appear more vivid to the human eye by proper selection of the color of the dye formed and the color of the receptor sheet, since the dye image in the film-former layer is ordinarily not opaque. By way of example, the apparently good contrast between a blue dye image in the film-former layer and a white receptor sheet may be improved, to the human eye, if a yellow receptor sheet is substituted for the white one. The lesser the distance between the layer bearing the image and the receptor sheet, the greator will be the apparent contrast.

If a greater degree of opacity is desired at non-image areas than has been created by vesicle formation during the exposure step, this can be accomplished by heating the film-former layer to a temperature higher than that of this layer when exposure was carried out. Application of heat to the film-former layer in which a discontinuity pattern has been created results in an increase in pressure of the confined gas as the temperature of the latter increases. Heating also produces a softening of the film-former. The combination of increased pressure in the gas and increased plasticity of the film-former leads to expansion of the light-scattering centers. Such heating should be employed as soon as possible after image formation, that is, before generated gas can diffuse from the film-former layer.

Also according to the invention, a master sheet as described herein and suitable for copy preparation by reflexing, can be utilized by carrying out so-called "see-through" (otherwise known as "shadow") exposure of the master sheet as an alternative to reflex exposure thereof. The process is the same except for the exposure step. One merely removes the filter (optionally, to increase the exposure speed) from between the master and the light source, and places the backside of the one-sided translucent or transparent original adjacent to the light source. The master sheet is placed against the original sheet with the surface of the original sheet (bearing the printed material to be copied) and the film-former layer of the master sheet facing each other. Exposure is made through the backside of the original. Images of improved fidelity over conventional "front-sided see-through" copy images are obtained by this "reverse see-through" exposure method.

In this connection, a conventional front-sided see-through exposure is made by placing the translucent original sheet against the sensitized sheet with the printed surface of the original facing away from the sensitized sheet and toward the actinic light source. It can be seen that with this front-sided see-through exposure, the printed surface of the original is separated from the sensitized sheet by the thickness of the original sheet whereas with the above-described reverse see-through exposure, the printed surface of the original contacts (the coated side of) the master sheet. It can be seen that this reverse see-through exposure is productive of copy or projection images of improved fidelity because unlike the case with front-sided see-through exposure, there is practically no path length along which diffusion of the actinic light can occur in passing from the printed surface of the original to the master sheet. Also, with the reverse see-through exposure there is practically no space (between the printed material of the original and the film-former layer of the master sheet) for "undercutting" of the printed material on the original due to the actinic light that travels from the light source along a path other than perpendicular to the printed surface of the original.

It will be apparent that a right-reading copy (as opposed to a mirror-image copy) is produced on the master sheet of the present invention when reverse see-through exposure is used and the master sheet is viewed from the base stock side which copy is also right-reading upon proper transfer of the film-former layer to a receptor sheet. It will further be noted that although a master sheet according to the present invention can be utilized to produce right-reading copy by carrying out front-sided see-through exposure as well as reverse see-through exposure, conventional diazo-coated copy paper (which is not either transparent or sufficiently translucent) cannot be utilized to produce right-reading copy by carrying out reverse see-through exposure.

Reverse see-through copies according to the present invention are ordinarily more intense than reflex copies made from the same master sheet material since a substantial amount of the diazonium compound is decomposed in the reflex operation before preferential reflection from non-printed areas occurs.

Coupling of exposed diazonium-containing layers, whether exposure is done by a reflex or see-through method, can be carried out either before, during, or after the transfer of the diazonium-bearing film-former layer to a receptor sheet, depending upon the development method employed and other factors. The following examples are illustrative. In the preparation of dye-colored projection masters, obviously, coupling is carried out without employing a transfer step at all. In the case of transfer being accomplished by removing the film-former layer from the master sheet, wherein fusion of the transfer layer is employed as a means of reducing adhesion of the film-former layer to the master, selection of the transfer material is made based upon its melting range to achieve transfer at any time relative to a thermal development step, including simultaneously with it. For a liquid development operation, transfer can be abetted by using a transfer layer which is readily softened by the developer liquid.

As is pointed out more in detail in the following examples, a number of additional modifications can be employed in utilizing the present invention. In this regard, a master sheet according to the invention can be prepared to yield a positive image of the original when white light is projected threthrough onto a white screen as an alternative to preparation of such a master sheet to give a negative image as previously described herein. Additional modifications pointed out in detail in the following examples include those whereby color is produced by projecting white light through a properly prepared master sheet onto a white screen and whereby a properly prepared master sheet can be operated upon to reverse from a negative image of the original to a positive image, and vice versa.

In the following examples, the coatings were made using wire-wound rods. During the application of liquid to the web, the wire-wound rod was rotated opposite to the direction of web travel, at a rate of approximately 360° rotation per 20 sec. The speed of rotation affects film thickness and, therefore, can affect experimental results.

EXAMPLE 1

This example illustrates the preparation of reflex images by employing a film-former layer containing a dissolved diazonium compound and coupler. Imagewise light-scattering center formation occurs during exposure. The vesicular images may be projected without subjecting the exposed master sheet material to a development step.

3 gm. Dow Chemical Company "Methocel 65 HG" 100 cp. viscosity hydroxypropyl methylcellulose product was added to 25 gm. $H_2O$ at 80–90° C. with agitation until the Methocel was wetted out. The remaining 72 gm. $H_2O$ required for a 3% solution was added at room temperature (about 25° C.) and agitation was continued until solution appeared to be complete. Clarity was improved by continuing agitation over a cold water bath at about 10° C.

The following solution was then prepared at room temperature with agitation:

100 gm. 3% Methocel 65 HG 100 cp. in $H_2O$
3.00 gm. urea
4.00 gm. thiourea
4.00 gm. citric acid
1.96 gm. 2,3-dihydroxynaphthalene-6-sodium sulfonate ("Developer BL." Fairmount Chemical Co.)
1 ml. isopropanol
3 drops butanol
2.2 ml. propylene glycol
9.00 gm. p-diazo-N-ethyl-N-hydroxyethylaniline .1/2 $ZnCl_2$ ("Sensitizer BO–1," Fairmount Chemical Co.)

The urea, thiourea, and citric acid were added together, then the coupler, Developer BL, followed by the alcohols and glycol in the order given, with the diazonium compound added last. When solution was complete, 25 gm. of this solution was added with agitation to 75 gm. $H_2O$ to form the solution for coatign.

Du Pont "Mylar" 100C, approximately 1 mil thick, was coated with the latter solution by passing the Mylar web under a ¼ inch #18 wire-wound stainless steel coating rod (R & D Specialties Co., Webster, N.Y.), the rod acting as a metering device for applying the coating from a puddle of solution on the moving web on the upstream side of the rod. A web speed of about 43 ft./min. was employed. Drying was accomplished by allowing the film to stand in room air having a relative humidity of approximately 7% at about 78° F. and was also readily accomplished by employing a forced-air convection oven and by employing a combined forced-air-infra-red heater device.

The sensitizer Mylar was placed over an original to be copied with the coated side placed against the multi-colored printed matter on the original. A filter, Ozalid UVHC 893–000, was placed against the Mylar side of the master sheet. This filter transmits 72% of incident light of 436 mμ wavelength and 0% of 405 and 365 mμ wavelengths as measured on a Bausch & Lomb "Spectronic 505" spectrophotometer. The combination of filter, master, and original was inserted into the exposure section of an Ozalid Dry Duplicator "Ozamatic" model 22,000 employing a nominal 75 watt/inch mercury vapor lamp. Exposure was carried out at an optimal speed of approximately 2.5 ft./min. For more precise speed regulation and, therefore, better exposure control, the original coarse speed control potentiometer of the machine was replaced with an equivalent 10-turn precision potentiometer.

The master sheet, now bearing an imagewise discontinuity pattern, was separated from the original and filter. A portion of the reflex-exposed master sheet was placed in a Bell & Howell "750 Specialist" slide projector. A negative white-on-gray image of the black-on-white original was projected. Similarly, white-on-gray images of colored print-on-white originals were projected. The projector allowed a considerable amount of actinic light to reach the exposed master, destroying the remaining diazonium compound in several seconds, without noticeable additional formation of light-scattering centers. The image was therefore fixed for projection purposes.

By placing this same portion of reflexed master sheet (either with or without projection) against a colored background, e.g. black, a black-on-gray (discontinuities) positive image pattern of the original was obtained.

Another portion of the reflex-exposed master sheet was held over a tray containing concentrated ammonium hydroxide solution. A blue image quickly became visible in areas containing preferably no scattering centers (but actually containing relatively few centers) as compared to high scattering center density in non-image areas on the master. The visual intensity of the blue image is magnified greatly by placing the master sheet against a pure white background, such as a white paper receptor sheet, preferably with the image-bearing layer on the master sheet placed in intimate contact with the white background sheet. Prolonged application of moisture, even as developer solution vapor, caused disappearance of the scattering centers.

A blue image obtained as just described is used to create a black image while, at the same time, increasing the apparent image density and contrast. Since the blue image is transparent, placing the developed master sheet containing the image against a contrasting sheet whose color is different from blue results in obtaining black image areas. The background color remains unchanged from that of the contrasting sheet unless it is completely obscured by remaining scattering centers on the master. These residual centers are readily destroyed by prolonged exposure to moist ammonia vapor during development. Naturally, the colors of the image and of the background sheet must be reasonably spectrally pure in order to obtain a true black. A good black on a significantly improved visibly contrasting background was observed here when the blue image was placed over a yellow contrasting sheet, the discontinuities of said background having first been essentially completely destroyed by prolonged exposure to moist ammonia fumes during development.

Another portion of the same master sheet material was exposed, in another operation, in a reverse-see-through manner using a one-sided translucent original. The printed matter was placed in contact with the diazo-layer of the master and unfiltered exposure was made through the original. Since the original was not a transparency and exposure was carried out at a rate lower than that for discontinuity formation in reflexing, no discontinuities formed, liberated gas diffusing from the film during exposure or not generated rapidly enough to create vesicles. The image, after development over a tray of ammonium hydroxide solution, was quite an intense blue and was best viewed by placing the developed master's diazo-layer in contact with a white or yellow contrasting sheet. The developed master sheet containing no light-scattering centers was put in the slide projector and projected as a high quality positive blue image on the white background of the projection screen.

Another reverse-see-through exposure was made, this time of a positive transparency. Vesicles formed when the transparency was used. The ammonia-developed projected image was blue on the dark gray background created by the vesicles in non-image areas. An undeveloped master, exposed in the same manner, projected as a negative white-on-gray.

A black formulation was prepared in the same way as the blue formulation except that, in addition to 1.96 gm. 2,3-dihydroxy naphthalene-6-sodium sulfonate, 0.30 gm. acetoacetanilide ("Developer NY," Fairmount Chemical Co.) and 0.10 gm. m-hydroxyphenylurea ("Developer U–16," Fairmount Chemical Co.) were employed as couplers.

Essentially similar results were obtained by substituting a black-developing diazo formulation for the blue formulation discussed above, except that the projected ammonia-developed image was gray or black rather than blue. Reflex exposure speed of about 3.1 ft./min. gave satisfactory ammonia-developed images.

EXAMPLE 2

This example illustrates a novel effect in vesicular reflex films; namely, using a Methocel solution containing a diazonium salt and no couplers, either a negative or a positive projection image can be obtained depending upon the speed of reflex-exposure of the master sheet.

The following solution was prepared:

100 gm. 3% Methocel 65 HG 100 cp. in $H_2O$
4.00 gm. citric acid.
4.00 gm. thiourea
1 ml. isopropanol
3 drops butanol
9.00 gm. p-diazo-N-ethyl-N-hydroxyethylaniline . 1/2 $ZnCl_2$ 25 gm. of this solution was mixed with 75 gm. $H_2O$ and 4 drops of General Aniline & Film "Igepal CO–630" polyoxyethylated nonylphenol surfactant were added with agitation. The solution was coated at a speed of about 43 ft./min. on 1 mil 100C Mylar using a #18 wire-wound rod. The coating was dried and exposed in reflex fashion in the Ozamatic machine employing the UVHC filter. An exposure speed of about 1.5 ft./min. produced a positive vesicular projection with no development required after exposure, while a speed of about 2.7 ft./min. produced a negative vesicular projection using a sample of the same film which also required no development before projection.

Low intensity actinic light from the projector lamp decomposed the residual diazonium compound, stabilizing against the effects of later accidental high intensity actinic radiation exposure.

Incorporation of 1.96 gm. 2,3-dihydroxynaphthalene-6-sodium sulfonate in the diazo solution formulation of this example produced similar results. However, a master sheet exposed so as to create a vesicular projection negative produced, upon ammonia development, either a blue projection positive on a white background or a blue reflexed image on a white background contrast sheet.

A portion of master sheet material containing this coupler and exposed at a slower machine speed to produce a vesicular projection positive did not produce a dye image upon ammonia development due to complete decomposition of diazonium compound in both image and non-image areas during the long time of exposure.

It is theorized that preparation of both negative-projecting and positive-projecting reflex images achieved in this example by variation of machine exposure speed is a consequence of the nucleation phenomenon associated with vesicle production during exposure. Taking first the case of exposure at lower machine speeds to produce positive projection images, the more intense exposure at the non-image areas of the master sheet material created a higher concentration of vesicle nuclei at these areas. The image areas of the master sheet material received a lower intensity of exposure, forming a smaller concentration of vesicle nuclei in these image areas. With the same total concentration of vesicle-creating gas liberated in both high-intensity-exposed and low-intensity-exposed areas, many very small and less efficiently scattering vesicles were formed in the high-intensity-exposed areas. In the low-intensity-exposed areas, the fewer nuclei formed at lower nuclei concentrations were able to grow to larger average size, forming vesicles that were better able to scatter light than were the smaller vesicles in the non-image areas.

On the other hand, in master sheet material exposed at higher machine speeds to produce negative projection images, more diazonium compound remains undecomposed in image areas than in non-image areas so that vesicle formation in the image areas is not as complete as in non-image areas where more complete decomposition occurs.

Master sheet material exposed by a reflex technique at lower machine speeds in this example and yielding a positive-projecting image produced a negative image of the original when said master sheet material is placed against a black background sheet.

EXAMPLE 3

This example illustrates the preparation and use of reflex master sheet material which produces a colored vesicular projection positive upon exposure, without further development, but which may be converted to a neutral-colored (gray and white) projection negative merely by subjecting it to a moist air for a brief period of time. Prolonged exposure to moist air results in complete image and color eradication. Color formation in projected images is achieved without dye formation in this example.

The following solution was prepared:

100 gm. 6% Gantrez AN–169 in $H_2O$
4.00 gm. thiourea
4.00 gm. citric acid
1 ml. isopropanol
3 drops butanol
2.2 ml. propylene glycol
9.00 gm. p-diazo-N-ethyl-N-hydroxyethylanilane .1/2 $ZnCl_2$.

"Gantrez" (General Aniline & Film) is a copolymer of methyl vinyl ether and maleic anhydride.

25 gm. of the above solution was mixed with 75 gm. $H_2O$ and 4 drops of Igepal CO–630 were added with agitation. Coating, drying, and reflex exposure were carried out in the same fashion as in Example 2 except that here a #10 wire-wound rod was used. Exposure was made at approximately 2.2 ft./min. Upon removal from the Ozamatic machine it was observed that the entire exposed master was covered with light-scattering centers. However, those centers corresponding to image portions of the original were considerably more opaque to transmitted light by visual inspection (against light from a fluorescent lamp as background) than were centers in background areas. A positive projection of this master sheet material yielded a pale blue image on a pale yellow background. At higher exposure speeds the colors became more intense. The same sheet of master material was removed from the projector and placed briefly (0–2 sec., approximately) over a beaker containing lukewarm (about 100–120° F.) water with the film-former layer closer to the liquid. The scattering centers in image areas were observed to disappear shortly, leaving a transparent image. Simultaneously, scattering-centers in the background areas of the master became more opaque to transmitted light in a striking change. The film was placed in a projector and a negative white-on-gray image was projected. Further exposure of the film (for several seconds) to moist air above the water was accompanied by a visible disappearance of the scattering centers throughout the film. Projection of the film at this point produced a blank white on the screen, all visible traces of color and vesicles having been destroyed.

It is theorized here that relatively uniform scattering centers of two different sizes are formed during the above described exposure step. Larger, more opaque centers form in the image areas where the intensity level of exposure is somewhat lower than the level in background areas. This is a direct consequence of preferred reflection of actinic light from background areas of the original. It is theorized that a large number of smaller scattering centers form in background areas while there is a preponderance of fewer but larger centers in image areas. It is further suggested that the scattering centers formed in image and in background areas are of relatively uniform size in these respective areas. A high degree of monodispersity is believed to be responsible for the color-projection qualities of these films.

The first exposure to moist vapor, it is believed, causes plasticization and complete collapse of the larger centers and simultaneous plasticization and growth of the smaller centers in the reflexed master sheet. Hence, a negative projection results. Color is lost due to the uncontrolled vesicle expansion in background areas. The final exposure to moisture results in complete collapse of the previously expanded vesicles in background areas with total loss of projected image.

The projected yellow background is not caused by residual undecomposed diazonium compound after the exposure step. This was proved by placing an unexposed portion of the same master sheet in the projector and observing that it was bleached in a few seconds. Insufficient diazonium compound is present in unexposed master sheet material to project a lasting yellow color in the absence of scattering centers.

As in example 2, incorporation of a blue coupler, 1.96 gm. of 2,3-dihydroxynaphthalene-6 sodium sulfonate, in the solution formulation of the present example gave a positive blue image from a reflexed negative vesicular projection master after ammonia-development of residual diazonium salt was carried out. The development of dyed images occurred at reflex exposure speeds which were sufficiently rapid to insure against complete destruction (burnout) of diazonium compound. These speeds generally produced negatives by visual inspection against a transmitted-light background of a fluorescent lamp. The ability to project colored images without development was present in master sheet material of this example containing the aforementioned coupler.

Hence, in carrying out the procedures of this example using a coating containing a blue coupler, a blue-gray image on a yellow-brown background was obtained by projecting a reflex exposed master (using the UVHC filter) without development. This colored projected image was converted to a negative white-on-gray projected image by exposure to water vapor. This latter negative was converted to a blue-on-white projection positive by exposure to ammonium hydroxide vapors for several seconds, sufficiently long to allow dye formation by coupling and also to allow for total vesicle destruction.

EXAMPLE 4

This example illustrates the content of Example 1 but differs in that it involves the use of another diazonium salt whose absorption spectrum in aqueous solution is similar to that of p-diazo-N-ethyl-N-hydroxyethylaniline .1/2 $ZnCl_2$ in a reflex operation employing the same UVHC filter.

A solution almost identical to the blue formulation of Example 1 was prepared. Here, however, the 9.00 gm. of p-diazo-N-ethyl-N-hydroxyethylaniline was replaced by 11.77 gm. of p-diazodiethylaniline $ZnCl_2$ ("Sensitizer DE–40" Fairmount Chemical Co.). When diluted, coated (with a #18 wire-wound rod), dried, exposed at a speed of about 2.2 ft./min. projected in a similar manner to that described in Example 1, similar results were obtained. Similar results were also obtained when a yellow contrast sheet was used in conjunction with the blue ammonia-developed images and also when reverse-see-through copies and masters for projection were prepared from transparent and translucent originals.

EXAMPLE 5

This example illustrates the preparation of reflex images by using a diazonium compound whose absorption spectrum in aqueous solution has a peak at a wavelength different from 380 mμ (that for Sensitizers BO–1 and DE–40), and also involving a filter whose transmission spectrum is different from that of the UVHC filter in an example similar in content to Example 1.

The following solution was prepared:

100 gm. 3% Methocel 65 HG 100 cp. in $H_2O$
3.00 gm. urea
4.00 gm. thiourea
4.00 gm. citric acid
1.96 gm. 2,3-dihydroxynaphthalene-6-sodium sulfonate
1 ml. isopropanol
3 drops butanol
8.10 gm. p-diazo-N-ethyl-o-toluidine zinc chloride
("Sensitizer DE–2" Fairmount Chemical Co.)

25 gm. of this solution was mixed with 75 gm. $H_2O$ and 4 drops Igepal CO–630 were added with agitation. Coating (with a #18 wire-wound rod) and drying were carried out as in Example 1, above. An aqueous solution of Sensitizer DE–2, employed here, exhibited an absorption peak whose maximum was at 373 mμ.

Reflex exposure was made in the Ozamatic machine using a sheet of filter material obtained from the Antara Division of General Aniline & Film Corp. and said to be 1.2 mil cellulose acetate containing 1.5% 2,2′-dihydroxy - 4,4′ - dimethoxy-benzophenone (Antara "Uvinul D–49," General Aniline & Film Corp.) This Uvinul filter exhibits 0% transmission to 365 mμ radiation and 72 and 89% at 405 and 436 mμ, respectively. Use of the Uvinul filter enabled creation of the required light-scattering centers during exposure when used in conjunction with films containing Sensitizer DE–2. The UVHC filter, on the other hand, did not give center formation during exposure and produced significantly less dense developed images with poorer contrast than did the Uvinul filter with the master sheet material of this example.

Upon development over ammonium hydroxide solution the vesicles disappeared and a blue positive image on a white background was obtained.

The master sheet material was exposed in a reverse-see-through method using transparent and translucent originals as described in Example 1 above with similar results.

EXAMPLE 6

This example illustrates the preparation of either positive or negative projection transparencies depending upon exposure speed, from master sheet material coated with a Methocel film-former exposed in a reflex operation. The combination of diazo absorption spectrum and filter in the present example differs from those in Example 2.

The Methocel solution of Example 2 was prepared, except that here the 9.00 gm. of p-diazo-N-ethyl-N-hydroxyethylaniline .1/2 $ZnCl_2$ was replaced by 8.10 gm. p-diazo-N-ethyl-o-toluidine zinc chloride.

4 drops of Igepal CO–630 were added to a mixture of 25 gm. of the above solution and 75 gm. of water with agitation. A #18 wire-wound rod (at about 43 ft./min.) was used to prepare the coating. Reflex exposure in the Ozamatic machine at a speed of about 0.90 ft./min. employing the Uvinul D–49 filter produced a positive projection which was a light gray on a white background. A projection negative was obtained by increasing the exposure speed to about 1.30 ft./min. No development was required for either the positive-or-negative-projecting master sheet material. The negative and positive images obtained at the aforementioned speeds had considerably weaker contrast than the samples of Example 2.

EXAMPLE 7

This example illustrates the preparation of colored vesicular projection positives by reflex exposure of an original, without involving further development. In the present example, both the diazonium compound absorption spectrum and the filter material employed differ from those employed in Example 3. Gantrez AN–169 is retained as the film-former.

The solution of Example 3 was prepared except that 9.10 gm. of p-diazo-N-ethyl-o-toluidine zinc chloride was substituted for the 9.00 gm. p-diazo-N-ethyl-N-hydroxyethylaniline .1/2 $ZnCl_2$ in that example. Dilution, coating (with a #10 wire-wound rod), drying, reflex exposure and projection were carried out as in Example 3, however the Uvinul D–49 filter was used instead of the UVHC filter. Exposure at a speed of about 5.3 ft./min. yielded a blue-on-yellow projection image. Colors were more intense at higher exposure speeds. The exposed master sheet material was held over a beaker of water at room temperature for a few seconds. When projected, the blue-on-yellow changed to a white-on-gray negative of the original. All traces of projected color and vesicles disappeared upon prolonged exposure to water vapor.

EXAMPLE 8

This example illustrates the preparation of colored projection positives or negatives by reflex exposure of the novel master sheet material of this invention without necessarily employing a filter other than a neutral density filter and without employing dye-forming couplers in the master sheet material. Colored projections of black-on-white originals, as well as red-, green-, blue-, yellow-, etc. on-white are prepared, all without any development step whatsoever. Reversal and loss of projected color occur upon exposure to water vapor.

With thin-line-transparency originals, direct-positive-projecting vesicular images are prepared by a see-through method employing a white background sheet during exposure. Exposure of the coating of the master sheet to plasticizing moisture by application of a single human breath is sufficient to create reversal of these positive-projecting images of line transparencies.

The solution of Example 7 was coated on 1 mil Mylar with a #18 wire-wound rod at a speed of about 43 ft./min. After drying, reflex exposure was made through a Kodak "Photographic Step Tablet No. 2" with no filter employed. This gray scale has 21 steps in the density range of approximately 0.05–3.05. Exposures were made with the emulsion side of the gray scale toward the lamp and the coating containing the diazonium compound facing the printed matter on the original. The purpose of the gray scale was to enable exposure to be carried out over a wide range of actinic light intensity for a series of given exposure speeds. Reflex exposures of many colors of printed matter, each on a white background, were made throughout the entire speed range of the Ozamatic machine (about 0.8–23.0 ft./min.) in intervals of about 2 ft./min. The exposed master sheet material was projected immediately with no intervening development step.

The results were quite interesting in that in various parts of this experiment all colors of the spectrum were obtained by projection.

Colors were obtained in as many as about six or seven adjacent steps of the gray scale at its low density end. The colors obtained depend upon machine exposure speed and intensity of actinic light. The projected images consist of an image of one color on a background of another color in the area of a given step of the step tablet. Furthermore, the projected images, for a given machine exposure speed, projected as positives in areas of the master sheet material exposed through densities on the step tablet and projected as negatives in those areas exposed through higher density areas on the step tablet. Black, yellow, green, blue, and red print on white background in the original gave the same general color projection results, namely, the projection of all colors of the spectrum by variation of exposure intensity and rate of exposure for each color of printed matter. Positives and negatives, as discussed above, were also obtained regardless of the color of the printed matter on the original, in areas exposed through low and high step densities, respectively.

Brief exposure of reflex-exposed master sheet material to water vapor prior to projection gave, instead of color projection, image reversal and no color. Master sheet material exposed through low density portions of the step tablet now projected as a white-on-gray negative of the original while material exposed through higher density portions lost all traces of image. On the other hand, when reflex-exposed master sheet material was exposed to light in the projector prior to subjecting it to contact with water vapor, loss of projected color resulted and image reversal at both high and low-density ends of the step tablet occurred.

It is believed that the projection of color is a direct consequence of the generation of light-scattering vesicles of narrow size-distribution, each area of a given projected color having a given predominant-sized vesicle. Vesicle size and, hence, color of the projected image is a function of both the intensity and rate of exposure. Naturally, the absorption spectrum of the diazonium compound, the aforementioned properties of the film former, and so forth, are also important factors. As before, prolonged exposure to moisture vapor resulted in vesicle collapse.

Using the same master material in a continuation of the experiment, a reverse-see-through exposure of a silver halide positive transparency was made at a speed of about 23 ft./min. A white paper backing sheet was placed against the uncoated side of the Mylar before exposure. No filter or step tablet was employed and no image was obtained by immediate projection. However, a single brief application of human breath prior to projection produced a startling development of a vesicular image pattern on the exposed master which then projected as a high fidelity white-on-black negative of the original.

Exposure of the same master sheet material to the same positive line transparency at a speed of about 6.4 ft./min., followed by immediate projection, gave a positive image of the thin lines of the transparency rather than a negative image as obtained at the higher exposure speed. Here, a white backing sheet was again employed during exposure. Projections corresponding to thick lines on the transparent line original consisted of a white background and white interior portions of the thick lines but black-projecting borders or outlines of these thick lines. By switching to a black backing sheet, this "edge effect" for thick lines disappeared and both thick and thin lines failed to generate visicles capable of creating a projected image at the same exposure speed (about 6.4 ft./min.).

EXAMPLE 9

This example also illustrates the preparation of colored projection positives and negatives by reflex exposure of master sheet material without necessarily employing a filter other than a neutral density filter. Essentially, this example is quite similar to Example 8, however, the diazo solution employed here uses p-diazo-N-ethyl-N-hydroxyethylaniline .1/2 $ZnCl_2$ as the light-sensitive compound. Example 8, on the other hand, uses p-diazo-N-ethyl-o-toluidine zinc chloride.

The solution of Example 3 was coated on 1 mil Mylar using a #18 wire-wound rod and a coating speed of about 43 ft./min. Exposures were made through the step tablet throughout the exposure speed range of the Ozamatic machine as in Example 8. Immediate projection of negative and positive colored images resulted, as was the case in Example 8. Reversal and loss of color was obtained in this example as in Example 8 by subjecting reflex-exposed film to water vapor.

Similar results to those obtained in Example 8 were also obtained here when reverse-see-through of a transparency was made and vesicles were developed with moisture from a single human breath. Direct projection of positive copy of a line transparency also resulted in the present example as it did in Example 8, accompanied by the edge effect described therein.

EXAMPLE 10

This example illustrates the content of Example 1 in that reflex images are prepared from a film-former layer (other than Methocel used in Example 1) containing a diazonium compound and a coupler. It also illustrates creation of brown-projecting vescular images by a second, overall exposure of a reflexed master sheet in the projector and subsequent exposure to water vapor, the first projection containing no evidence of vesicular color projection.

The following solution was prepared:

100 gm. 6% Gantrez AN–169 in $H_2O$
3.00 gm. urea
4.00 gm. thiourea
4.00 gm. citric acid
1.96 gm. 2,3-dihydroxynaphthalene-6-sodium sulfonate
1 ml. isopropanol
3 drops butanol
2.2 ml. propylene glycol
9.00 gm. p-diazo-N-ethyl-N-hydroxyethylaniline .1/2 $ZnCl_2$ 25 gm. of this solution was diluted with 75 gm. $H_2O$ and 4 drops Igepal CO–630 were added with agitation. The resulting solution was coated on 1 ml. Mylar using a #10 wire-wound rod at a speed of about 43 gt./min. The coating was dried in room air.

Sharp blue ammonia-developed reflex images were obtained using the UVHC filter at a speed of about 3.6 ft./min. for the exposure step. The exposure speed here was greater than that in Example 1 probably due to the fact that this coating contained less diazonium compound per unit area.

Color formation in image and background areas did not occur in reflexed undeveloped projected samples of this master sheet material. However, brownish color did form in image areas after UVHC filtered reflex exposure was made at a speed of 5.3 ft./min. followed by exposure to light in the projector for a few seconds (which decomposed some of the residual diazonium compound) and then by exposure to water vapor prior to reprojection.

Upon subjecting the master sheet material containing the brown-projecting vesicular image and the remainder of the residual diazonium compound to ammonia, a blue dye formed in the image areas, all traces of the brown color disappearing with loss of the vesicular nature of the image areas upon exposure to the moist ammonia. A blue-on-white positive image was then projected.

EXAMPLE 11

This example illustrates two separate and distinct reversal effects produced either by variation of exposure speed (as in Example 2) or by exposure to water vapor (as in Example 3) in a diazo-containing layer employing Gantrez AN–169 as a film-former rather than Methocel. The contents of this example differ from those of Example 3 wherein a thinner Gantrez coating not containing a coupler was used and which projected colored vesicular images.

This example also illustrates the effect of a second exposure to unfiltered actinic light (this time in the projector), the first exposure having been a reflex exposure of the original using the UVHC filter in the Ozamatic machine. Application of water vapor to master sheet material exposed twice as described produces a black-on-white projection positive in the present example.

The coating solution of Example 9 (containing the surfactant) was coated on Mylar at a speed of about 43 ft./min. with a #18 wire-wound rod. When reflexed using the UVHC filter at exposure speeds of about 1.08–1.50 ft./min., a black-on-gray image with no color was projected immediately after exposure. Contact with vapor over a beaker of water for a few seconds produced reversal: a colorless clear white image on a gray background was projected. Exposure of the same master sheet material at speeds of about 1.75–2.35 ft./min. produced reflex projected images which were gray-on-black. Hence, by gradually increasing speed of exposure, images changed gradually from black-on-gray to gray-on-black. Thus far, all samples were alike in that they projected as white-on-gray after being subjected to water vapor after the first projection.

At exposure speeds of about 2.35 ft./min. and higher this master sheet material continued to give darker and darker gray-on-black images upon immediate projection.

Ammonia development resulted in obtaining blue images on white background at exposure speeds of 1.92 ft./min. to 2.65 ft./min. Above the latter speed, the background areas become blue as well, getting darker with increasing exposure speed.

At an exposure speed of about 2.97 ft./min., the gray-on-black projected image, after exposure to water vapor, projected as black-on-white in areas which were struck by light from the projector in the first projection. Color formation by coupling could not be carried out in previously projected areas by exposure to ammonium hydroxide vapors, since the projector destroyed residual diazonium compound required for coupling during the first projection.

In all previous and later-presented examples, careful control was exercised over the drying operation following coating. Under-drying produced a coating which was too soft, leading to vesicle formation at abnormally high exposure speeds and sometimes causing vesicle collapse at normal exposure speeds. Over-drying produced a film which was too rigid to allow vesicle formation during exposure regardless of how slow the exposure speed. Optimal drying conditions must be employed, as is the case in preparing diazo--coated papers in actual commercial operations.

EXAMPLE 12

This example illustrates the preparation of reflex images employing glassine, rather than Mylar, as the master sheet material base stock.

Glassine, about 1.2 mil thick, was prepared for coating with an aqueous diazo solution by first applying a 10% solution of "Saran F–220" (Dow Chemical Company) in methyl ethyl ketone with a #12 wire-wound rod at a coating speed of about 43 ft./min. Without this Saran coating, the glassine wrinkled badly when an aqueous solution was applied to it. After the glassine had dried, the diazo coating solution of Example 1 was applied with the #18 wire-wound rod. Then, a top coat of 10% "Piccolastic D–150" (Pennsylvania Industrial Chemical Corp.) in benzene was applied witih a #12 wire-wound rod to reduce the tendency of the glassine master to stick to the original during exposure. Coating speed for these films was also about 43 ft./min.

Reflex exposure in the Ozamatic machine was carried out at speeds of about 1.83–2.10 ft./min. with the coated side of the glassine placed against the printed matter on the original and the UVHC filter interposed between the light source and the glassine. Light-scattering centers formed in non-image areas during exposure. The exposed master sheet material was held over a tray of ammonium hydroxide solution, whereupon a blue image developed which was right-reading when viewed through the glassine. Reverse-see-through exposures of one-sided translucent and transparent originals were made which produced much more intense developed images than the reflex exposure produced, as was the case with the Mylar master sheet base stock.

The developed reflexed image on glassine was much less dense than that on Mylar. This may be due to the greater transparency of Mylar to both actinic light and viewing light. The actinic light affects the rate of vesicle formation and, hence, the contrast. Some improvement in contrast resulted when the film-former layer on the glassine was placed against a white contrast sheet.

EXAMPLE 13

This example illustrates the preparation of colored projection positives or negatives by reflex exposure of the master sheet material of this invention employing only a neutral density filter between the exposure source and the master. No development step is required before projection. The content of this example is similar to that of Examples 8 and 9 except that in the present example a different film-former is employed.

The following solution was prepared:

100 gm. 6% "PVP type NP–K30 (polyvinylpyrrolidone, General Aniline & Film) in $H_2O$
4.00 gm. thiourea
4.00 gm. citric acid
1 ml. isopropanol
3 drops butanol
2.2 ml. propylene glycol
8.10 gm. p-diazo-N-ethyl-o-toluidine zinc chloride 25 gm. of this solution was added with agitation to 75 gm. $H_2O$. 4 drops of Igepal CO–630 surfactant were added and agitation was continued until the surfactant was dissolved. The solution was coated on 1 mil Mylar with a #18 wire-wound rod at a speed of about 43 ft./min. After drying, reflex exposure was carried out interposing a Kodak Photographic Step Tablet No. 2 between the glass exposure drum of the Ozamatic machine and the Mylar surface of the master sheet material. Reflex exposure was made at various speeds throughout the entire speed range of the Ozamatic machine. As described in Examples 8 and 9, colored projection positives and negatives were obtained.

Brief exposure of these color-projecting films to moisture vapor resulted in eradication of the colors of projection as well as image reversal. Prolonged exposure to moisture vapor resulted in complete loss of image.

EXAMPLE 14

This example illustrates thermally induced transfer of an ammonia-developed reflex image to a receptor sheet from master sheet base stock carrying the diazonium compound in a film-former. A soft transfer layer is interposed between the film-former layer and the Mylar base stock and also serves as an anti-gloss material.

The transfer solution was prepared by diluting 25 gm. of a 6% solution of Gantrez AN–139 with 75 gm. $H_2O$ and adding 4 drops of Igepal CO–630. It was coated on 1 mil Mylar at a speed of about 43 ft./min. using a #18 wire-wound rod.

The diazo solution was applied to the dried transfer layer at the same coating speed and employing the same coating rod. The composition of the diazo solution was identical to the blue-forming solution of Example 1.

Reflex exposure was made using the UVHC filter at a speed of about 2.5 ft./min. Development of a visibly intense blue image was achieved over a tray of ammonia.

The film-former layer incorporating the blue developed image was transferred from the Mylar base stock to a sheet of receptor paper (West Virginia Pulp and Paper Clear Spring Transparentizing Stock White Bond Paper, Substance Weight 16) by simultaneous application of heat and pressure. The apparatus used consisted of an internally heated, chrome-plated drum having a 6 inch diameter. A fluorocarbon-coated woven glass belt (General Plastics Corp., Bloomfield, N.J.) transported the master sheet and receptor sheet around the drum, the drum rotating at a circumferential speed equal to the linear speed of the belt. Drum temperature of 250° F. and 350° F. were employed. Transfer was achieved at both temperatures with similar results. In the thermal transfer operation it was found more desirable to place the receptor sheet in contact with the developing drum while the master sheet's Mylar surface was in contact with the belt. The belt was kept under tension during the operation. The Mylar base stock was peeled from the receptor sheet leaving the image behind on the receptor sheet. The copy had a somewhat less glossy surface after the Mylar was peeled off than was the case when the transfer layer was omitted. The image remained quite sharp and dye density did not appear to be reduced significantly by the application of heat uring transfer. Only a few seconds of heating were required to achieve transfer of the image from the master sheet to the copy sheet.

The weave pattern of the woven glass belt employed in the thermal unit was impressed to some degree upon the surface of the final copy sheet further reducing its apparent surface gloss.

When exposure was made by reverse-see-through rather than by reflexing, image transfer was achieved in the same way.

EXAMPLE 15

This example illustrates thermal development and transfer of a reflex-exposed diazo layer to a receptor sheet containing a material capable of liberating an alkaline material upon the application of heat.

A master sheet was prepared and exposed exactly as in Example 14. Here, however, the receptor sheet was coated with a solution of 20 gm. urea in 80 gm. of a solution of 20 gm. of 3% Methocel 65 HG 100 cp. in $H_2O$ and 60 gm. $H_2O$. Four drops of Igepal CO-630 were added to this 100 gm. of solution and the coating was applied at a rate of about 43 ft./min. to the receptor paper of Example 14 using the #18 wire-wound rod.

The reflex-exposed diazo layer on the master sheet was placed in contact with the urea-containing layer on the receptor sheet. The two-sheet combination was inserted in the thermal developing device described in connection with the thermal transfer of Example 14. Once again, the backside of the receptor sheet was placed against the drum. Complete thermal development and transfer of the dye image was achieved in less than 10 seconds at a development temperature of about 350° F. Lower temperatures, but still above the decomposition temperature of urea, required somewhat longer development times.

Image density of thermally-developed and transferred copies was less than that for ammonia-developed and thermally transferred copies. This was to be expected since some of the diazonium compound in the image areas was probably destroyed at the elevated development temperatures. It was observed that under the described conditions of thermal development, the color of the final image was more black than blue. The color shift was probably caused by the observed discoloring of the receptor or copy sheet in the thermal unit. Certain other papers did not discolor noticeably under identical conditions.

EXAMPLE 16

This example illustrates both thermally induced transfer of an ammonia-developed reflex image as well as thermal development and transfer of a reflex image. In this example, the content of which is similar to Examples 14 and 15, no transfer layer is employed.

The diazo solution used in Examples 14 and 15 was coated directly on Mylar and dried as it was in those examples. Reflex exposure was also made in the same way. Development was carried out in one case by using ammonia (as in Example 14) and, in a second case, thermally (as in Example 15). Transfer to the respective receptor sheets was achieved in the same way as previously described in the respective examples.

With the exception of a somewhat greater pressure required to achieve transfer and somewhat greater copy surface gloss in the present example, the results were quite similar to those of Examples 14 and 15 in which a transfer layer was employed.

Similar results were also obtained when master sheets exposed by the reverse-see-through method were developed and transferred.

EXAMPLE 17

This example illustrates the preparation of diazo reflex copy using a sheet of ordinary paper as a receptor sheet. This is accomplished by incorporating all active ingredients in the master sheet and transferring them thermally, with simultaneous image development, to the receptor sheet.

The master sheet was prepared by first coating on 1 mil Mylar (with a #18 wire-wound rod at about 43 ft./min.) a solution prepared by dissolving 2.5 gm. urea in 97.5 gm. of a solution made by diluting 25 gm. of a 6% aqueous solution of Gantrez AN-139 with 75 gm. $H_2O$ and adding 4 drops of Igepal CO-630 to the 100 gm. of solution. This coating solution serves as base release, transfer, and anti-gloss layers, all-in-one.

The blue diazo solution of Example 1 was coated on top of the all-in-one layer at the same speed but employing a #24 wire-wound rod. Reflex exposure through the UVHC filter at a speed of about 2.1 ft./min. was made and the coated side of the master sheet was placed in contact with the uncoated paper from West Virginia Pulp & Paper Company (as referred to in Example 14) in the thermal unit. After about 10 seconds of heating at 350° F. the Mylar was peeled from the receptor sheet to which the diazo layer bearing the developed image had been transferred.

Reverse see-through exposure followed by thermal development with transfer gave denser images than did reflex exposure. Ammonia development, however, gave more intense images than thermal development for both types of exposure.

Having thus provided a written description of the present invention and provided specific examples thereof, it should be understood that no undue restrictions or limitations are to be imposed by reason thereof but that the present invention is defined by the appended claims.

What is claimed is:

1. In a photocopying process that produces a vesicular image employing a light-sensitive master sheet comprising an optically transmissive base stock having an optically homogeneous and transmissive film layer thereon, said layer comprising a film-forming material and an image-forming diazo compound, said compound is substantially uniformly dispersed throughout said film-forming material and said compound generates a gas upon exposure to actinic radiation within a certain frequency range and has a radiation absorption characteristic including one or more relative peaks within said certain frequency range, the process steps of:

placing the diazo layer of said master sheet in contiguous relationship with an image-bearing surface of an original document, and reflex exposing with actinic radiation for the diazo compound through said base stock and diazo layer for a sufficient time such that substantially more gas is generated in the areas of the diazo layer contiguous with the non-image areas of the said original document as compared with areas of the diazo layer contiguous with the image areas of the said document because of the substantially greater reflection of actinic radiation in the non-image areas of the said document back into areas of the diazo layer contiguous therewith as compared with areas of the diazo layer contiguous with the image areas of the said document in order that the retained gas generated in the diazo layer contiguous with the non-image areas causes sufficient expansion of the said film-forming material to form optically visible vesicles internally in said diazo layer, said reflex exposure excludes the said peak absorption frequency or frequencies of the actinic radiation for the diazo compound so as to substantially reduce the absorption of actinic radiation by the said compound in the said layer during only the reflex portion of the actinic radiation exposure.

2. A process according to claim 1 wherein said vesicular image is rendered more visible by the further steps of:

subjecting said master sheet to a second exposure to actinic radiation in a substantially uniform manner at a lower intensity to decompose the remaining diazo compound without substantial vesicle formation;

allowing the gas generated by said second exposure to diffuse out of said master sheet;

and transferring said diazo layer to a dark receptor sheet.

3. A process according to claim 1 wherein said vesicular image is rendered more visible by the further steps of:

subjecting said diazo material to a second exposure to actinic radiation in a substantially uniform manner at a lower intensity to decompose the remaining diazo compound without substantial vesicle formation;

allowing the gas generated by said second exposure to diffuse out of said master sheet;

and projecting said image which is a negative image of the original document with visible light.

4. A process according to claim 3 wherein parameters are selected so that, in addition, sufficiently small vesicles are formed in the remaining areas of said vesicular image, whereby, at least temporarily, a colored image is projected with a white light source.

5. A process according to claim 1 wherein said master sheet comprises at least one layer of material jointly and/or severally incorporating an azo coupling component and an alkali releasing material, said azo coupling component reacts with said diazo compound to form an azo dye upon being subjected to heat and after said exposure to actinic light said master sheet is heated substantially uniformly.

6. A process according to claim 5 in which said master sheet comprises at least one layer of a transfer material under said diazo layer, said transfer material is responsive to heat to release said film for transfer to a receptor sheet, and said alkali-releasing treatment and transfer step are accomplished with a single application of heat to said master sheet.

7. A process according to claim 1 in which a plurality of said master sheets are employed to form separate vesicular images in the respective master sheets thereof, of one or more original documents, and said image-bearing master sheets are then placed in overlying relationship to form a single composite picture.

8. A process according to claim 1 wherein said master sheet comprises at least one layer of material jointly and/or severally incorporating an azo coupling compound which reacts with said diazo compound to form an azo dye only upon being subjected to a predetermined treatment selected from the group consisting of (1) the application of ammonia and (2) the application of an alkaline developing solution, and after said exposure said master sheet is so treated.

9. A process according to claim 1 in which said diazo compound is a diazonium compound.

10. A process according to claim 1 wherein said master sheet has at least one layer of a gloss-eliminating material under said diazo layer.

11. A process according to claim 1 wherein the master sheet has at least one layer of a transfer material under said diazo layer.

12. A process according to claim 1 wherein the master sheet has an adhesive top layer over said diazo layer.

13. In a photocopying process that produces a vesicular image employing a light-sensitive master sheet comprising an optically transmissive base stock having an optically homogeneous and transmissive film layer thereon, said layer comprising a film-forming material and an image-forming diazo compound, said compound is substantially uniformly dispersed throughout said film-forming material and said compound generates a gas upon exposure to actinic radiation within a certain frequency range and has a radiation absorption characteristic including one or more relative peaks within said certain frequency range, the process steps of:

placing the diazo layer of said master sheet in contiguous relationship with an image-bearing surface of an original document, and reflex exposing with actinic radiation for the diazo compound through said base stock and diazo layer for a sufficient time and sufficient intensity of radiation to produce a high rate of gas generation in the areas of the diazo layer contiguous with the non-image areas of the said original document as compared with areas of the diazo layer contiguous with the image areas of the said document because of substantially greater reflection of actinic radiation in the non-image areas of the said document back into areas of the diazo layer contiguous therewith as compared with areas of the diazo layer contiguous with the image areas of the said document in order that the gas generated in the diazo layer contiguous with the non-image areas of the said document diffuses out of the film so rapidly that optically visible vesicles are not produced while the gas generated in the diazo layer contiguous with the image areas of the said document is substantially retained such that optically visible vesicles are produced, such reflex exposure excludes the said peak absorption frequency or frequencies of the actinic radiation for the diazo compound so as to substantially reduce the absorption of actinic radiation by the said compound in the said layer during only the reflex portion of the actinic radiation exposure.

14. A process according to claim 13 having the following additional step after the reflex actinic radiation exposure of the said master sheet, exposing the master sheet to actinic radiation for the said diazo compound in a substantially uniform manner at a low intensity of radiation such that the remaining diazo compound is decomposed without substantial vesicle formation, and allowing the generated gas to diffuse out of the said master sheet, and projecting visible light through said master sheet such that a positive projection image is produced.

References Cited

UNITED STATES PATENTS

| | | | |
|---|---|---|---|
| 2,494,906 | 1/1950 | Slifkin et al. | 96—91 XR |
| 2,528,395 | 10/1950 | Slifkin | 96—75 |
| 2,541,178 | 2/1951 | Slifkin | 96—91 XR |
| 2,916,622 | 12/1959 | Nieset. | |

(Other references on following page)

UNITED STATES PATENTS

| | | | |
|---|---|---|---|
| 2,528,395 | 10/1950 | Slifkin | 96—75 |
| 2,699,392 | 1/1955 | Herrick et al. | 96—91 |
| 2,911,299 | 11/1959 | Baril et al. | 96—49 |
| 3,032,414 | 5/1962 | James et al. | 96—49 |
| 3,294,534 | 12/1966 | Halperin et al. | 96—75 XR |
| 3,298,833 | 1/1967 | Gaynor | 96—27 |
| 2,114,468 | 4/1938 | Van der Grinten | 96—47 |
| 2,245,628 | 6/1941 | Von Poser et al. | 96—91 |
| 2,246,425 | 6/1941 | Von Poser et al. | 96—91 |
| 2,409,564 | 9/1946 | Heinecke et al. | 96—83 |
| 2,660,526 | 11/1953 | Herrick | 96—47 |
| 2,733,994 | 2/1956 | Purdy | 96—47 |
| 2,747,999 | 5/1956 | Yutzy et al. | 96—91 |
| 2,980,534 | 4/1961 | Printy et al. | 96—49 |
| 2,996,381 | 8/1961 | Oster et al. | 96—49 |
| 3,027,256 | 3/1962 | Klimkowski et al. | 96—75 |
| 3,060,023 | 10/1962 | Burg et al. | 96—35.1 |
| 3,121,650 | 2/1964 | Meissner | 250—65.1 |
| 3,128,181 | 4/1964 | Doggett | 96—75 |
| 3,130,051 | 4/1964 | Herrick et al. | 96—49 |
| 3,159,487 | 12/1964 | Kreiger et al. | 96—75 |

| | | | |
|---|---|---|---|
| 3,161,517 | 12/1964 | Doggett | 96—75 |
| 3,194,659 | 7/1965 | Baus et al. | 96—47 |
| 3,194,660 | 7/1965 | Lahr | 96—47 |
| 3,222,171 | 12/1965 | Land | 96—91 |

FOREIGN PATENTS

| | | |
|---|---|---|
| 402,737 | 3/1932 | Great Britain. |

OTHER REFERENCES

Murray, H. D., "Theory and Practice of Reflex Copying," The Photographic Journal, August 1944, pp. 250–253.

Reflex Paper, Ansconian, May–June 1955 (pp. 14–15) relied on.

NORMAN G. TORCHIN, Primary Examiner

C. L. BOWERS, Jr., Assistant Examiner

U.S. Cl. X.R.

96—15, 28, 30, 49, 75, 83, 87, 91; 250—65.1